Figure 1:
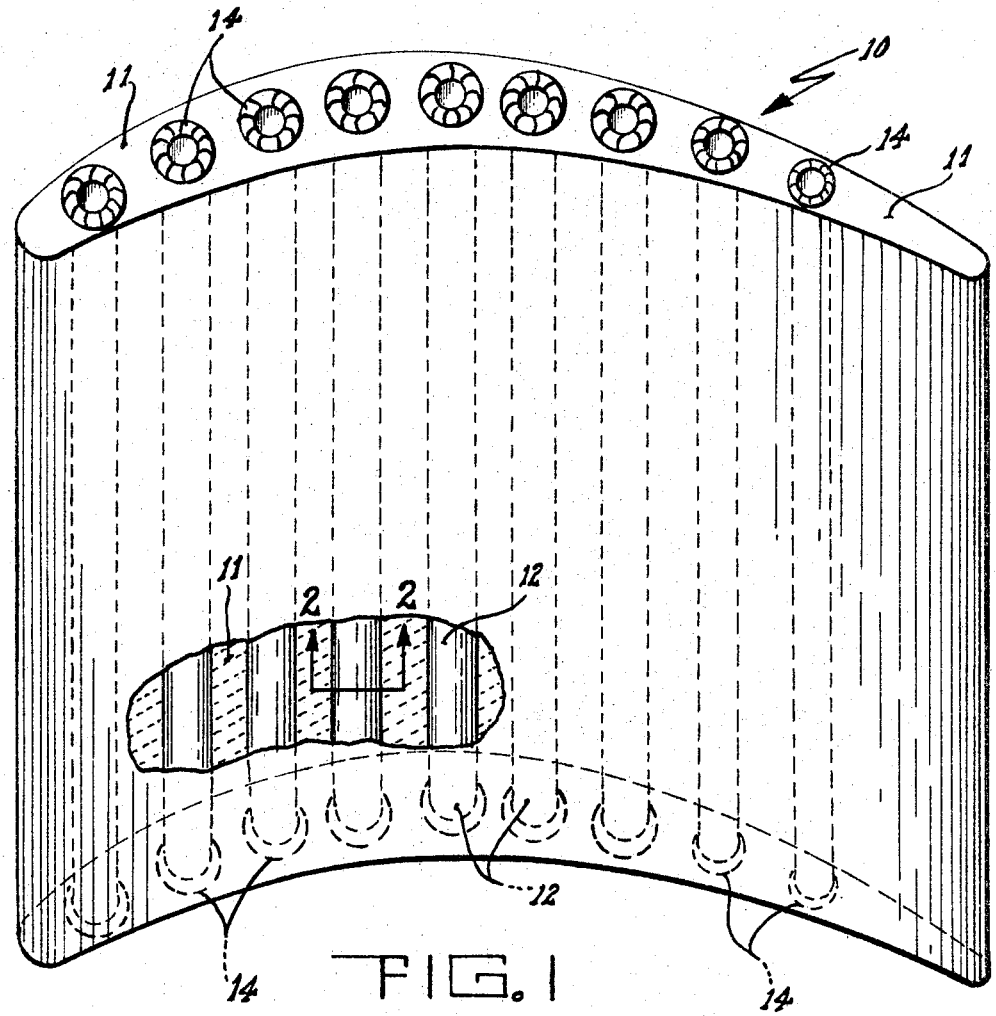

INVENTOR.
ROBERT J. SMULAND
BY Harry A. Herbert Jr.
   Sherman H. Goldman and
                    ATTORNEYS

United States Patent Office 3,271,004
Patented Sept. 6, 1966

3,271,004
TURBINE VANE ADAPTED FOR HIGH
TEMPERATURE OPERATION
Robert John Smuland, Reading, Mass., assignor to the United States of America as represented by the Secretary of the Air Force
Filed June 22, 1965, Ser. No. 466,131
1 Claim. (Cl. 253—39.1)

This invention relates generally to turbine vanes, and more particularly to a turbine blade arrangement which utilizes ceramics under compressive forces.

In the operation of gas turbine engines, it is desirable to run them at as high a temperature of the gas as possible in order to increase the efficiency of the engines. With the present steel blades or vanes, the metal forming the vane is subject to corrosion and erosion which limits the temperature at which the turbine can be operated. It is desirable to have, therefore, a blade or vane made of some material which will stand the high heats encountered. Ceramic material would appear to be the answer, but blades or vanes made of ceramic material will not stand the strains or stresses encountered in this use. Ceramic materials in general have low tensile strength and will not stand the centrifugal stresses resulting from high speeds. It has great strength, however, under compression.

This invention contemplates the strengthening of ceramic material in a novel manner so that, when used as described, the ceramic material will withstand the stresses imposed on vanes in a high speed turbine rotor.

It is an object of this invention, therefore, to provide turbine vanes made of ceramic material which will withstand the rotational speed of rotors.

It is a further object to provide a means of cooling ceramic vanes by utilizing, as a passageway for coolant, the means for causing compressive forces on the ceramic.

Briefly, this invention comprises a vane of ceramic material, such as silicon carbide, with holes running longitudinally through the said vane and provided with metal tubes passing through said holes. The tubes are flared at both ends in order to provide strength by putting the ceramic material under compression. This provides the necessary strength to withstand the rotational strain placed on a vane in a high speed rotor. The compressive load on the ceramic vanes will be further increased when the blades are in operation since cool air coming up through the tubes cools them more than the ceramic material, which tends to expand under heat. The selection of the metallic tubing would be made so that the thermal co-efficient of expansion is matched for the application of the operating temperatures.

The compressive load will thus not only result from the original flaring of the metal tubes, but will continue to be applied as the vanes revolve and cooling air is brought up through the tubes and the ceramic material surrounding them expands due to the thermal effects of the hot gases.

Figure 2:
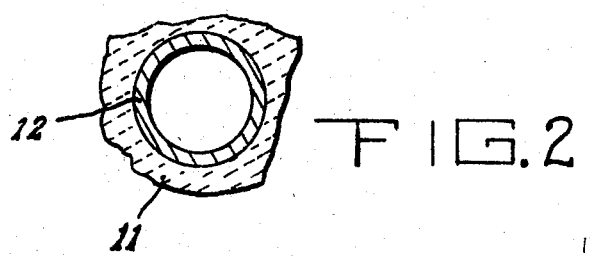

The structure of the invention and its operation will be better understood by an examination of the attached drawings in which:

FIG. 1 is a view partly in cross-section of a ceramic vane with metal tubes shown therein; and FIG. 2 is a cross-section along lines 2—2 of FIG. 1, illustrating the holes in the ceramic vane with metal tubes therein.

In FIG. 1 there is shown a vane 10 having an airfoil cross-section. The vane is comprised mainly of ceramic material which is designated by the numeral 11. Since the ceramic material has low tensile strength, the material is placed under compression by means of a series of rods 12 extending therethrough. In order to provide compressive loading the metallic rods 12 are flared as shown at 14 over the ends of the vane 10. A tight fit is achieved between the rods 12 and machined or cast holes in the solid vane. If desired, the flared ends of the rods may be recessed in the ceramic portion of the vane.

As shown in FIG. 1 and FIG. 2, the rods 12 may be hollow tubes and thereby provide a dual function of applying compressive loading and providing an air passage for coolant in a manner conventional in the art.

In order to apply compressive loading, the tube could be heated prior to the flaring operation on the tube at 14, thereby causing additional compression as the tube cools. When the vane 10 is mounted for operation and cooled air is passed through the hollow interior of the tubes 12, the temperature of the metallic tubes is considerably less than that of the ceramic material. The ceramic material grows or expands due to the thermal effects, and the interaction between the tubes and the ceramic causes an increase in compressive loading.

It should be noted that the tubing material 12 must be selected so that the coefficient of thermal expansion is matched for the application, operating temperature and and tube temperature. Once the tensile mechanical and thermal stresses in a vane are calculated, the compressive load to be applied must be made greater.

The principles of this invention are applicable to almost any attachment arrangement of the vanes to a rotor structure, and any conventional means may be utilized. Thus, there has been shown a simple, efficient means for strengthening a ceramic vane in order to enable it to withstand stresses caused by high speed, high temperature gas turbine engine operation, while at the same time providing means for cooling the vane which also improves its compressive forces.

Although the invention has been described with reference to particular embodiments, it will be understood to those skilled in the art that the invention is capable of a variety of alternative embodiments within the spirit and scope of the appended claim.

I claim:

A rotary vane for gas turbine engine comprising: a ceramic member of airfoil cross-section; said member having longitudinally extending holes, serially arranged along its lateral axis; and metal tubes fitted in and extending through the holes of said ceramic member; said tubes being flared at each end and adapted to carry a coolant; said tubes further constructed of a metal such that the thermal coefficient of expansion is matched to the ceramic vane whereby the compressive load on the vanes, caused by flaring the ends of said tubes, is increased at higher temperatures.

References Cited by the Examiner
UNITED STATES PATENTS

| 2,479,057 | 8/1949 | Bodger | 253—77 |
| 2,687,278 | 8/1954 | Smith et al. | |
| 3,098,723 | 7/1963 | Micks | |
| 3,163,397 | 12/1964 | Gassmann et al. | 253—77 |

FOREIGN PATENTS

| 235,304 | 6/1925 | Great Britain. |
| 574,770 | 1/1946 | Great Britain. |
| 660,007 | 10/1951 | Great Britain. |

MARTIN P. SCHWADRON, Primary Examiner.

SAMUEL LEVINE, Examiner.

E. A. POWELL, Jr., Assistant Examiner.